United States Patent [19]
Brown

[11] Patent Number: 5,929,750
[45] Date of Patent: *Jul. 27, 1999

[54] TRANSMISSION NETWORK AND FILTER THEREFOR

[75] Inventor: Paul Anthony Brown, Kendal, United Kingdom

[73] Assignee: NORWEB plc, United Kingdom

[ * ] Notice: This patent is subject to a terminal disclaimer.

[21] Appl. No.: 08/826,983

[22] Filed: Apr. 9, 1997

Related U.S. Application Data

[63] Continuation of application No. 08/347,427, Nov. 29, 1994, Pat. No. 5,684,450, filed as application No. PCT/GB93/02163, Oct. 20, 1993.

[30] Foreign Application Priority Data

Oct. 22, 1992 [GB] United Kingdom .................. 9222205

[51] Int. Cl.⁶ ................................................ H04M 11/00
[52] U.S. Cl. .............................. 340/310.02; 340/310.01; 340/310.03; 340/310.07; 324/548
[58] Field of Search ..................... 340/310.01, 310.02, 340/310.03, 310.07; 324/548

[56] References Cited

U.S. PATENT DOCUMENTS

| | | |
|---|---|---|
| 1,547,242 | 7/1925 | Strieby . |
| 2,577,731 | 12/1951 | Berger ...................................... 179/2.5 |
| 3,696,383 | 10/1972 | Oishi et al. .............................. 340/310 |
| 3,846,638 | 11/1974 | Wetherell .................................... 307/3 |
| 3,942,170 | 3/1976 | Whyte .................................. 340/310 A |
| 3,993,989 | 11/1976 | Held et al. ........................... 340/310.01 |
| 4,142,178 | 2/1979 | Whyte et al. ........................ 340/310 R |
| 4,359,644 | 11/1982 | Foord ................................. 340/310.02 |
| 4,367,522 | 1/1983 | Forstbauer et al. ..................... 363/137 |
| 4,383,243 | 5/1983 | Krugel et al. ....................... 340/310.02 |
| 4,409,542 | 10/1983 | Becker et al. ........................... 324/434 |
| 4,419,621 | 12/1983 | Becker et al. ............................ 324/51 |
| 4,471,399 | 9/1984 | Udren ....................................... 361/64 |
| 4,475,209 | 10/1984 | Udren ......................................... 375/4 |
| 4,479,033 | 10/1984 | Brown et al. .......................... 179/2.51 |
| 4,517,548 | 5/1985 | Ise et al. ............................. 340/310 R |
| 4,701,945 | 10/1987 | Pedigo ...................................... 379/66 |
| 4,766,414 | 8/1988 | Shuey .................................. 340/310 A |
| 4,772,870 | 9/1988 | Reyes ...................................... 340/310 |
| 4,912,553 | 3/1990 | Pal et al. ............................ 340/310.01 |
| 5,066,939 | 11/1991 | Mansfield ............................ 340/310 R |
| 5,068,890 | 11/1991 | Nilssen ..................................... 379/90 |
| 5,148,144 | 9/1992 | Sutterlin et al. ..................... 340/310 A |
| 5,319,634 | 6/1994 | Barthlolomew et al. ................. 370/18 |
| 5,406,249 | 4/1995 | Pettus ................................. 340/310.08 |
| 5,477,091 | 12/1995 | Fiorina et al. ...................... 340/310.01 |
| 5,497,142 | 3/1996 | Chaffanjon ......................... 340/310.06 |
| 5,559,377 | 9/1996 | Abraham .................................. 379/66 |
| 5,684,450 | 11/1997 | Brown ................................. 340/310.02 |
| 5,717,685 | 2/1998 | Abraham ............................ 340/310.01 |

FOREIGN PATENT DOCUMENTS

| | | | |
|---|---|---|---|
| 0141673 | 5/1985 | European Pat. Off. .......... H04B 3/56 |
| 2326087 | 4/1977 | France .............................. H04B 3/54 |
| 1548652 | 7/1979 | United Kingdom ............. H04B 3/54 |
| 2101857 | 1/1993 | United Kingdom ............. H04B 3/56 |
| WO84/01481 | 4/1984 | WIPO .............................. H04B 3/54 |
| WO90/13950 | 11/1990 | WIPO .............................. H04B 1/50 |
| WO92/16920 | 1/1992 | WIPO .............................. H04B 3/54 |
| WO93/07693 | 4/1993 | WIPO .............................. H04J 13/00 |

*Primary Examiner*—Edward Lefkowitz
*Attorney, Agent, or Firm*—Arnold White & Durkee

[57] ABSTRACT

A power transmission network which includes an input of telecommunication signals having carrier frequencies greater than 1 MHz onto the network, and removing similar speech and/or data signals from the network. Preferably a network conditioning element is used which includes a low pass filter portion for filtering out a low frequency high amplitude mains power signal, and a coupling element for input and/or removal of telecommunication signals from the network. In this way both speech and data signals can be transmitted at carrier frequencies of greater than 1 MHz along a standard electricity distribution and/or transmission network which when conditioned provides a larger available spectrum per unit length of network and greater transmission capacity than previously known. The quiescent noise level of the conditioned network is also much reduced thus permitting lower signal injection levels for a given signal-to-noise ratio and a consequential reduction in spurious radiation from the network.

10 Claims, 9 Drawing Sheets

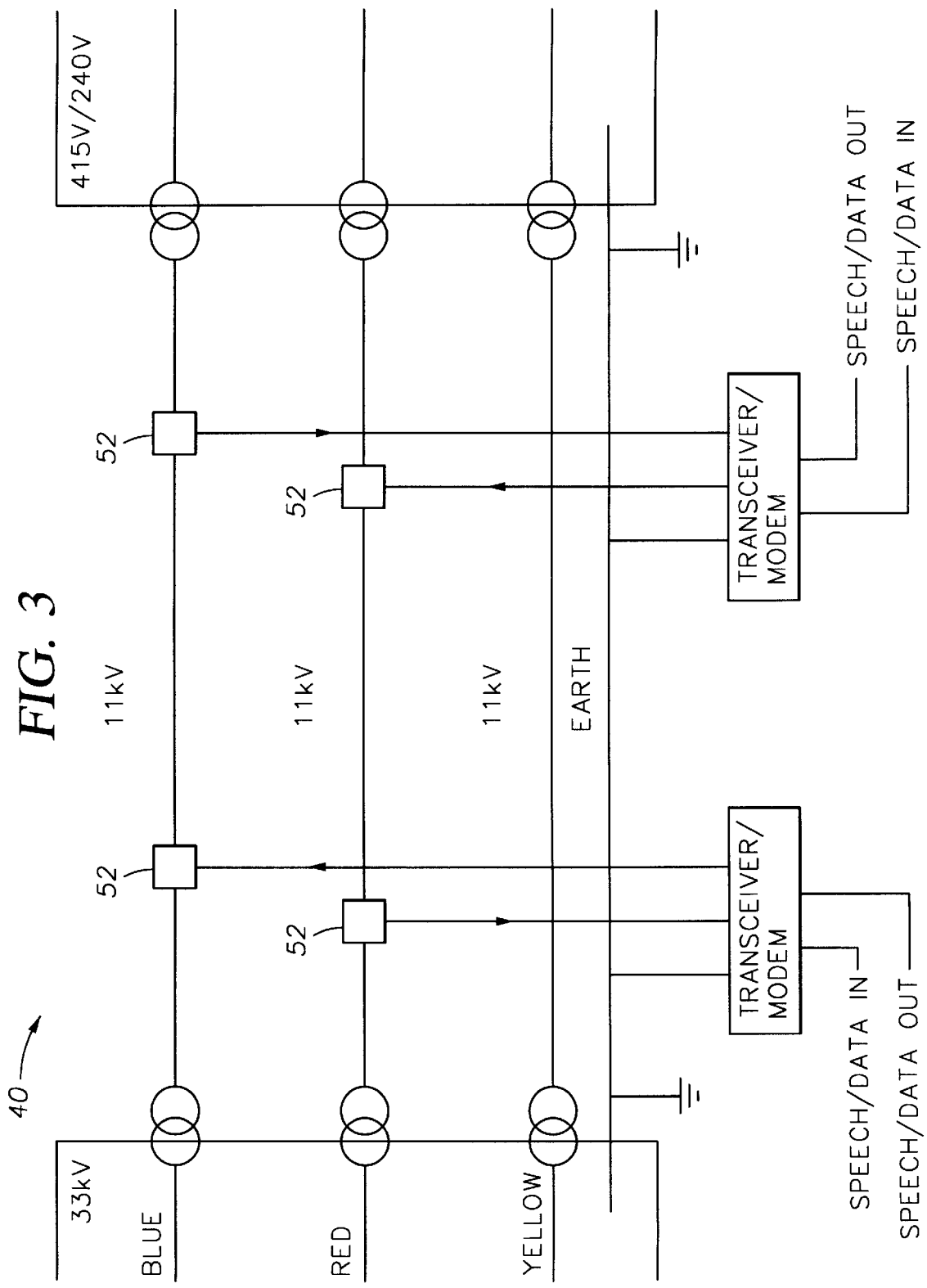

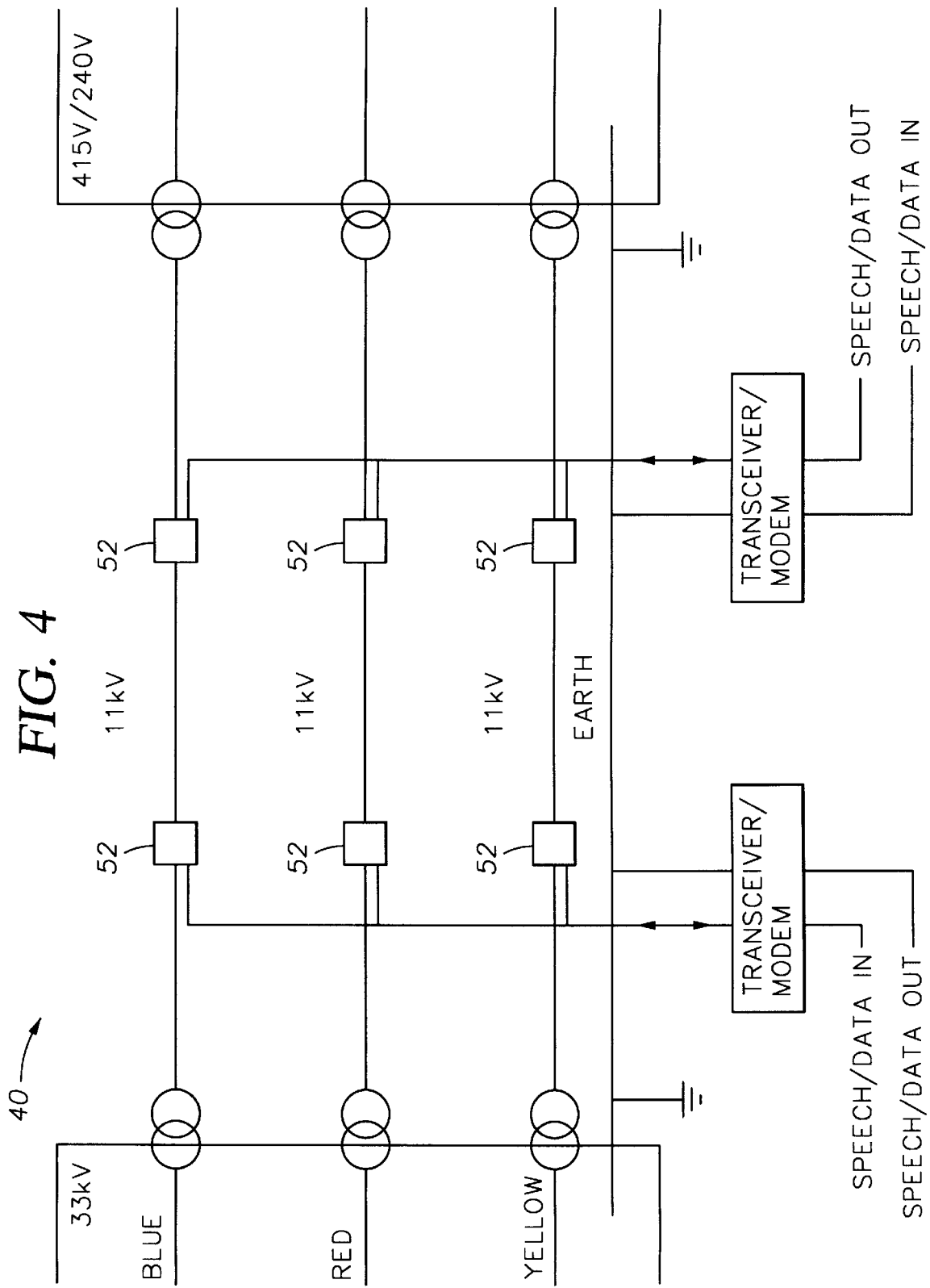

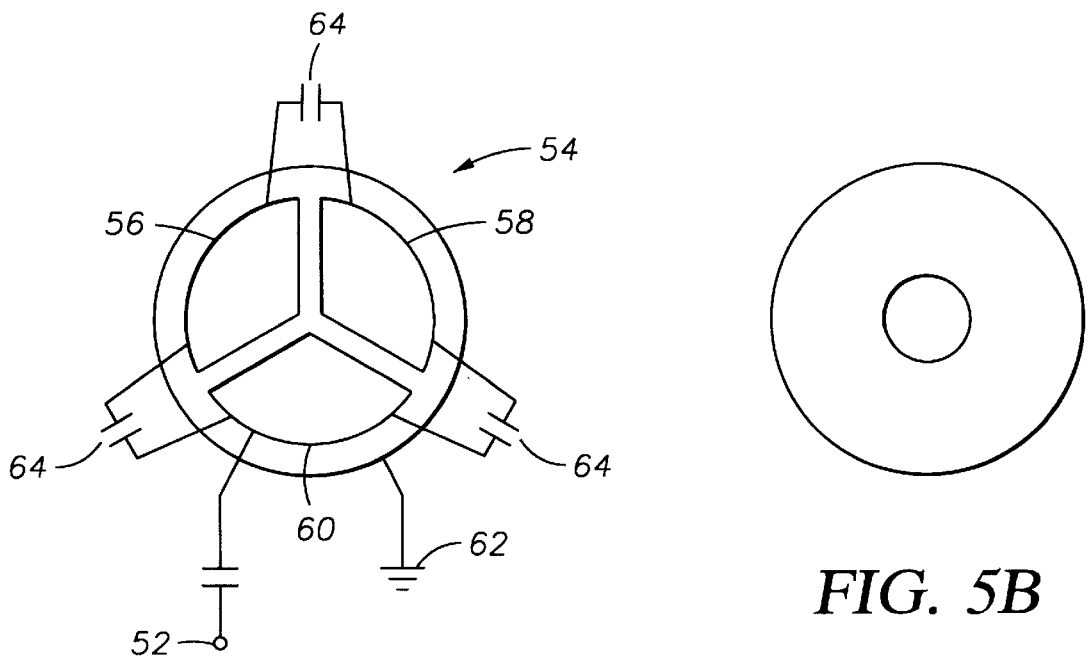
FIG. 5A
FIG. 5B
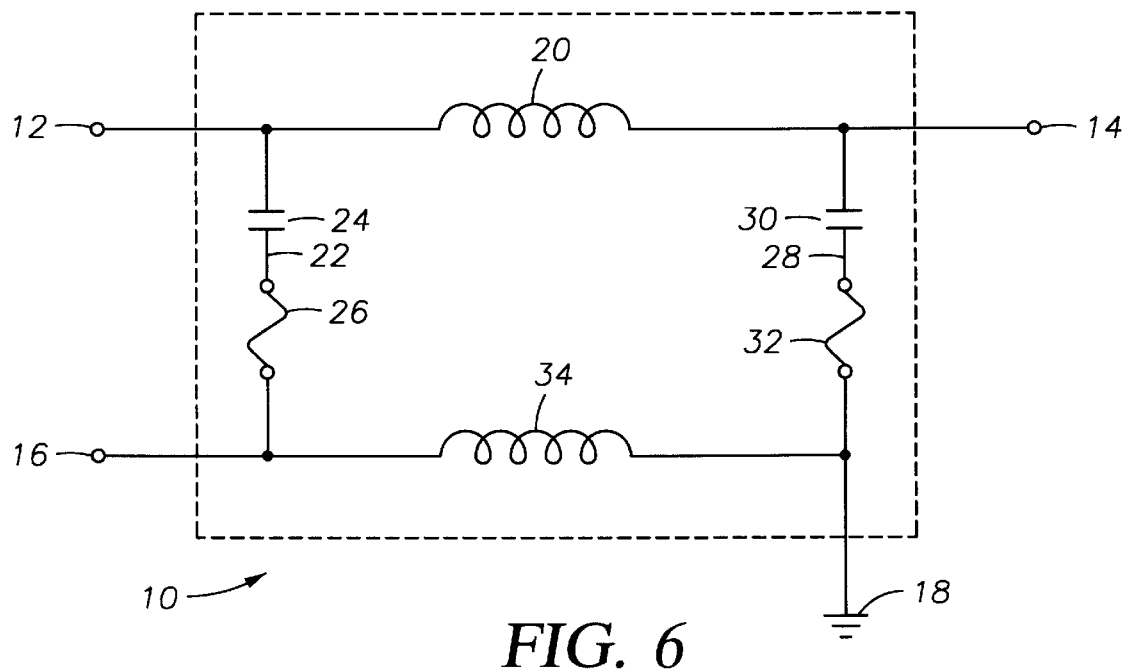
FIG. 6

TRANSMISSION NETWORK AND FILTER THEREFOR

This application is a continuation of application Ser. No. 08/347,427, filed on Nov. 29, 1994 (35 U.S.C. § 371 filing of PCT/GB93/02163 filed Oct. 20, 1993), now U.S. Pat. No. 5,684,450.

BACKGROUND OF THE INVENTION

1. Technical Field

This invention relates to a method of signal injection, transmission, interconnection (termination), and detection, and to a power transmission network; i.e., a mains electricity distribution and/or transmission network, and a filter therefor. In particular it relates to the use of electricity transmission networks and/or lines for telecommunications transmission (e.g. voice and/or data).

2. Background Art

In the UK, it is conventional to describe a power network for 33 kV and above as a "transmission network", and one for less than 33 kV as a "distribution network". In this specification the term "electricity distribution and/or power transmission network" is normally used, but general references to power networks and to transmission of signals are to be construed as applying to all such networks.

Traditionally telecommunications signals have been transmitted on independent networks e.g. telephone lines—more recently, in order to simplify and increase efficiency of telecommunications services to domestic or industrial premises, there have been investigations into using existing electricity transmission and distribution networks to carry telecommunications services.

It has been known to utilise above ground (overhead) power lines for the transmission of additional control, speech and data signals. However, with such transmissions, the frequency spectrum must be allocated for and restricted to particular applications in order to avoid interference with other telecommunications services. In addition, the strength of signals which can be transmitted is limited since the amount of radiation produced by the transmission is related to the strength of the signal and this radiation must be kept to a minimum.

Such transmission signals must therefore be of low power and confined within a specific frequency band allocated by international agreement for such purposes, so this mechanism is unsuitable for large scale voice and/or data transmission where signals extend well into the radio spectrum (e.g. 150 kHz and above).

It has been known to use spread spectrum techniques to transmit data at carrier frequencies of between 6 kHz and 148 kHz on underground and overhead power networks. Again, in this allocated frequency band such transmissions suffer from low data rates and low traffic capacities due to power line noise characteristics. Due to the limited spectrum available and high noise levels encountered wideband telecommunication signals cannot be sent.

Although papers such as J. R. Formby and R. N. Adams, "The mains network as a high frequency signalling medium", The Electricity Council, January 1970, suggested a communications potential for the low and medium voltage networks no further work was undertaken. Even today, with the prospect of remote meter reading and selective load control, solutions tend to employ techniques such as telephony and radio communications, thus avoiding the mains network where possible.

Ideas have been put forward but few have proceeded past the theoretical stage, due to the hostile environment presented by the mains network. The problems to overcome include electrical noise, (both constant background noise and transient spikes) and high attenuation of high frequency signals due to skin and proximity effects.

Messrs Formby and Adams suggested using frequencies in the range of 80 to 100 kHz. 100 kHz was recommended as a maximum because theory suggested that higher frequencies would suffer from excessive attenuation. Other papers recommend a maximum of 150 kHz due to the fact that radiated signals higher than 150 kHz would interfere with broadcast radio signals.

A further situation where power networks are also used for the transmission of speech and data signals is on the electricity wiring inside buildings. In such configurations the internal 240V mains wiring is used for the transmission of data, with appropriate filtering being provided to add and separate the data signals from the power signals. Additionally a filter, such as the Emlux filter described in European Patent Application 141673, may be provided to prevent data signals leaving the building and entering the power supply network external to the building. The Emlux filter described consists of a tuned ferrite ring which acts effectively as a band stop filter. In order to be effective the band stop filter must be of narrow band width and therefore is not suitable for use with high speed data communications, since a large number of such band stop filters would be required.

SUMMARY OF THE INVENTION

The present invention aims to provide a transmission network which alleviates some or all of the above problems.

Accordingly, in a first aspect, the present invention provides a power transmission and/or distribution network including input means for the input of a telecommunication signal having a carrier frequency greater than approximately 1 MHz onto the network, (e.g. an underground electricity transmission and/or distribution network), and output means for removal of similar telecommunication signal from the network.

Contrary to the teachings of the prior art, use of carrier frequencies of this magnitude is not impractical due to attenuation effects. This is because, at these higher frequencies, the cables of the power transmission and/or distribution network exhibit pseudo-coaxial characteristics and therefore attenuation is reduced.

In this way both speech and data signals can be transmitted at carrier frequencies of greater than approximately 1 MHz allowing for a larger available spectrum and greater transmission capacity. The carrier frequency may in fact be less than 1 MHz ie. 800 kHz or even as low as 600 kHz, but as it is reduced so is the bandwidth.

The term "carrier frequency" refers to the unmodulated frequency of the carrier signal, and not to the frequency of the telecommunication signal once modulated.

On, for example, a 415V network the carrier frequency may preferably be between 1–10 MHz, and on, eg., a 11 kV network may be between 5–60 MHz. However the frequency may be up to 100's of MHz depending on the network and the application. For example, over short distances (10–20 m) a frequency range of 1–800 MHz may be used.

Preferably the power network is a major underground power network including e.g. 132 kV, 33 kV, 11 kV, 415V and 240V sections. The voice and data signals may be transmitted over any or all of the sections of the power network by suitable detection, amplification and/or regeneration and reintroduction as and when necessary.

In preferred embodiments, full duplex facilities are provided i.e. signals may be transmitted and/or received in all directions simultaneously.

A network according to the first aspect of the present invention may be used for many speech and/or data transmission purposes, such as remote reading of electricity meters, remote banking and shopping, energy management systems, telephony (voice), switched telephony, security systems and/or interactive data services and television.

In a second aspect, the present invention provides a "network conditioning unit" for use with a network according to the first aspect of the present invention. The network conditioning unit includes a low pass filter portion or portions for filtering out the low frequency high amplitude mains power signal, a coupling element for input and removal of telecommunication signals from the network and, preferably, a terminating element of similar impedance to the characteristic impedance of the network at that point.

The use of such a unit ensures that the high frequency telecommunications signals do not contaminate the internal low voltage wiring present inside a premises, and/or that noise sources from the internal low voltage premises wiring do not contaminate or corrupt the high frequency telecommunications signals being transmitted over the external electricity transmission and/or distribution network.

Preferably, the variable electrical loading effects (i.e. the load impedances) of all items which are coupled onto the network, from time to time and which utilise electrical energy (i.e. the electrical loads) are isolated from the communications signals by the action of low pass filter elements of the conditioning unit(s).

Preferably an electrical filter is used at the interface between the external distribution network and the internal network of the premises, e.g. a house, of a user to ensure that the two signals are separated. Such a filter should have minimal effect on the normal domestic electricity supply.

The filter element of the present invention, which aims to reduce telecommunications signals entering the internal network of a users premises, preferably has no more than 1 volt dropped across it whilst supplying a 100 amp load from a 240V, 50 Hz, single phase source.

Preferably the network conditioning unit provides impedance matching between reception/transmission devices and the power network. Additionally the network conditioning unit can carry full load or fault current at power frequencies whilst still carrying the voice and data signals.

In a third aspect, the present invention provides a method of signal transmission including input of a telecommunication signal having a carrier frequency of greater than approximately 1 MHz onto an electricity power transmission and/or distribution network, and subsequent reception of the signal.

Where signals are being transmitted along a three phase electricity power cable, the signal propagation may be between any or all of the phases and ground. In the preferred embodiment the signal is injected between only one of the phases and ground, and this provides unbalanced transmission characteristics and the cable behaves as a pseudo coaxial transmission line.

A wide range of different transmission techniques are available for use with electricity power line communication each using various modulation methods including both frequency and time division multiplexing. It has been determined that the spread spectrum method offers inherent security and good interference rejection characteristics. These properties are achieved using a large band width and hence requires the design of a specific filter.

The network conditioning unit preferably includes a low pass filter comprising a main inductor arranged between a mains electricity input and a mains electricity output and connected at the mains electricity input end to a first capacitor and at the mains electricity output end to a second capacitor. The first capacitor connects the mains electricity input to a signal input/output line, and the second capacitor connects the mains electricity output to ground. The first and second capacitors are each of a predetermined capacitance depending upon the portion of the frequency spectrum which is to be utilised for communications purposes.

In this arrangement the main inductor is operative to prevent communications signals from the signal input/output line from entering the domestic/industrial premises. This inductor is therefore preferably of a high inductance such as 10 $\mu$H to 200 $\mu$H which is appropriate for frequencies of 1 MHz and above.

The first capacitor which connects the mains electricity input and the signal input/output line acts as a coupling capacitor to allow communication signals through from the signal input/output line whilst attenuating all low frequency components at or about the main electricity supply frequency (ie., 50/60 Hz).

The second capacitor arranged between the mains electricity output and ground provides a further attenuation of communication signals.

In the event of failure of either the first or second capacitor each such capacitor is preferably provided with a respective fuse. The fuse of the first capacitor is connected in series with the first capacitor between the mains electricity input and the signal input/output line. The fuse of the second capacitor is connected in series with the second capacitor between the mains electricity output and ground. Furthermore an additional safety precaution can be incorporated by provision of a second inductor arranged between the connections between the signal input/output line and the first and second capacitors. This inductor has no effect on communication frequency signals but will provide a path to ground if the first capacitor develops a fault thereby allowing the first fuse to blow without allowing the power frequency signal onto the signal input/output line.

The inductance of the main inductor depends upon the material of which it is made and the cross-section of the wire wound around the core. The 10 $\mu$H inductance previously specified is preferably a minimum and with use of better core material a higher inductance, for example of the order of 200 $\mu$H, can be obtained. Alternatively, a number of inductors connected in series could be used.

The coupling capacitor has a capacitance preferably in the range 0.01 to 0.50 $\mu$F and the second capacitor linking the mains electricity output with ground has a capacitance preferably in the range of 0.001 to 0.50 $\mu$F.

The second inductor arranged on the signal input/output line preferably has a minimum inductance of approximately 250 $\mu$H. This inductor therefore has no effect on communication frequency signals on the signal input/output line. The conductor used to construct the 250 $\mu$H inductor should be of sufficient cross-sectioned area to take fault current should the decoupling capacitor fail to short circuit condition.

Preferably, any spurious or self resonance in the inductive or capacitive elements are avoided.

In a preferred embodiment the filter is assembled in a screened box so as to provide a good earth and prevent radiation of the communication signals.

BRIEF DESCRIPTION OF THE DRAWINGS

Embodiments of the present invention will now be described with reference to the accompanying drawings in which:

FIG. 3 is a schematic diagram of a second transmission system for a network according to the present invention;

FIG. 4 is a schematic diagram of a third transmission system for a network according to the present invention;

FIG. 5A is a cross section through a typical three phase cable;

FIG. 5B is a section through a typical coaxial cable;

FIG. 6 is a preferred embodiment of a network conditioning unit according to an aspect of the present invention;

DETAILED DESCRIPTION OF THE PREFERRED EMBODIMENTS

Figure 1:
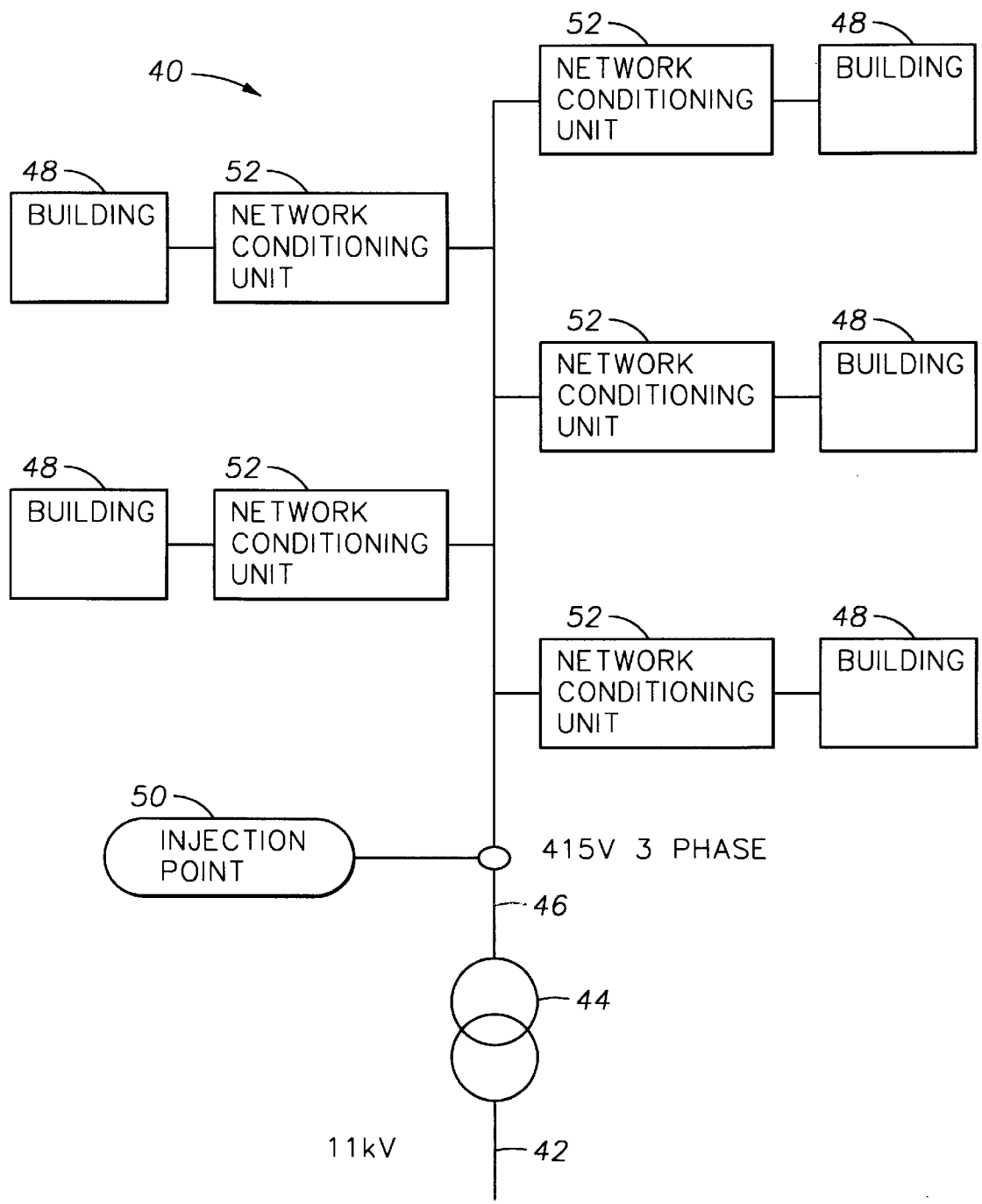
FIG. 1 is a schematic diagram of a part of a network according to aspects of the present invention.

FIG. 1 shows generally a network 40. Mains electricity enters the network from an 11 kV transmission line 42, via a transformer 44 and onto a 415V three phase network 46. The 415V three phase network is supplied to a number of locations, such as buildings 48. Each of these buildings may receive only a single phase electricity supply or alternatively may receive a three phase power supply.

Voice and data signals may be injected into the network (or alternatively received from the network) at an injection point 50, to be received by users in the premises 48. In order to separate the voice and data communication signals from the low frequency high amplitude power signal, each signal destination is provided with a network conditioning unit 52. This network conditioning unit includes a low pass filter for separating out the two signals.

Figure 2:
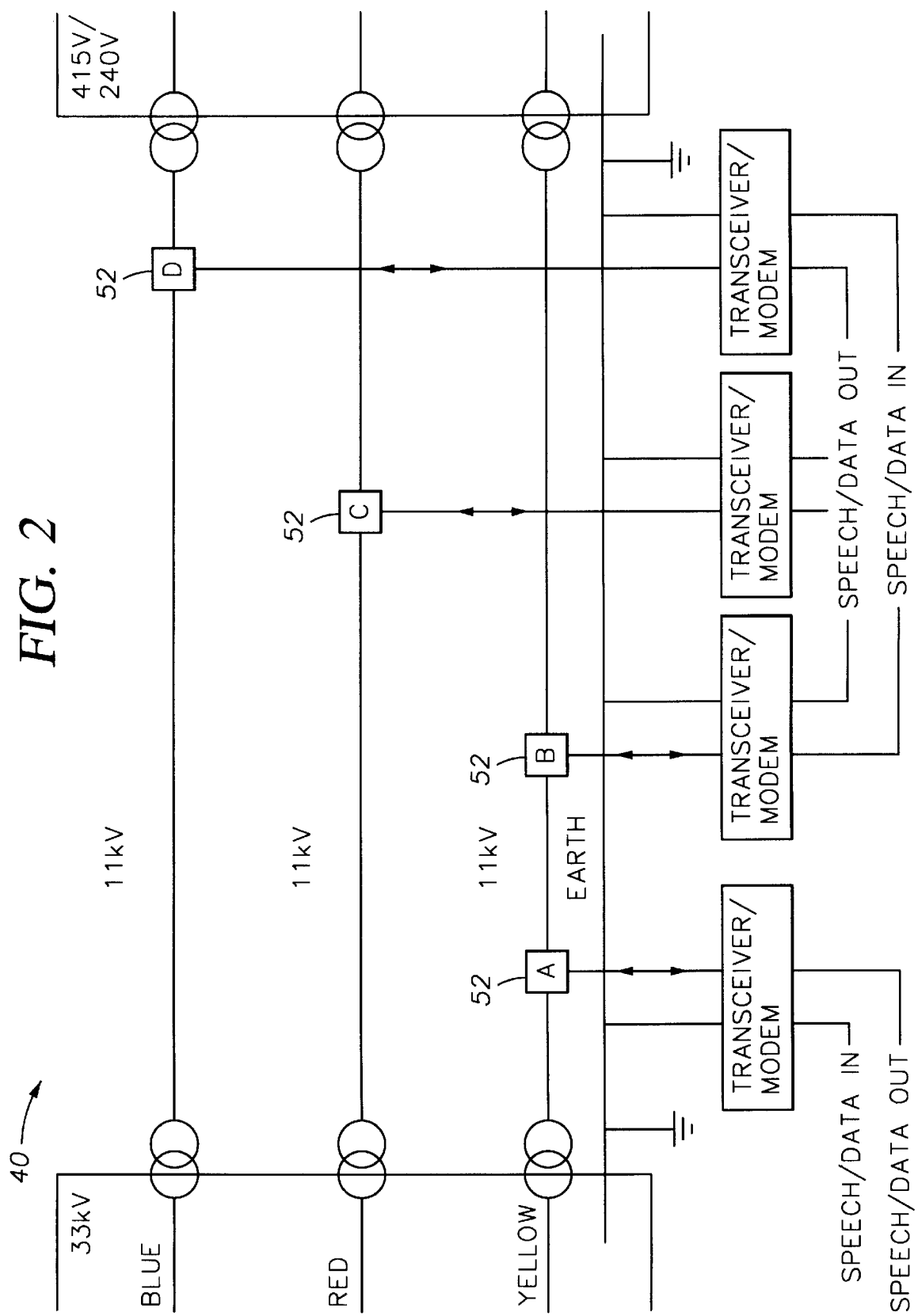
FIG. 2 is a schematic diagram of a first transmission system for a network according to the present invention.

FIG. 2 shows a portion of a three phase network 40 into which and from which data signals may be transmitted and received using the network conditioning units 52. As an example, data signals could be transmitted onto the yellow phase of the network by network conditioning unit 52A i.e., the signal is applied between the yellow phase and earth as shown. The transmitted data may then be received by any or all of conditioning units 52B, 52C and 52D which are connected to the yellow, red and blue phases respectively. In other words transmitted data may be picked up on any phase of the cable, including the phases onto which the signals were not injected by the transmitting unit. This is due to the mutual capacitance between the phase conductors producing an effectively pseudo-coaxial nature of the three phase cable. As can be seen, data can be transmitted and received by each unit.

FIG. 3 shows a portion of a three phase network 40 into which and from which data signals may be transmitted and received using four network conditioning units 52. As shown, the data signals are transmitted across two phases of the three phase network—in this case the red and blue phases.

In FIG. 4 an alternative transmission system to FIG. 2 is shown, in which the data signals are transmitted across all three phases, i.e. blue, red and yellow, of the three phase network 40.

FIG. 5A shows a simplified cross section of a three phase power cable 54, including red phase 56, yellow phase 58, and blue phase 60. Data signals are transmitted between blue phase 60 and earth 62, and are injected into the network via network conditioning unit 52. At high frequencies, the mutual capacitance between the phases effectively produces a short circuit. Therefore, such a transmission system gives a pseudo-coaxial characteristic, roughly equivalent to the coaxial cable shown in FIG. 5B. The mutual capacitance between any two of the phases in the three phase cable is shown schematically as 64 in FIG. 5A—similar mutual capacitance exists between other parts of phases.

Referring to FIG. 6 an embodiment of a filter according to an aspect of the invention is indicated generally by the reference numeral 10 and is connected between a mains electricity input 12 and a mains electricity output 14. A signal input/output line 16 is also connected into the filter. The mains power line is a standard 50 Hz mains electricity power supply providing a domestic electricity power source of 240V at a maximum current of 100 amps for normal usage.

The filter 10 is assembled into a metal box which prevents radiation of the communication signals to externally located appliances and which provides a connection 18 to earth for the signal input/output line 16. The filter 10 includes a first or main inductor 20 formed of 16 mm² wire wound on a 10 mm diameter, 200 mm long ferrite rod with 30 turns of wire therearound. This provides an inductance of approximately 50 µH. This may be a minimum for the signal characteristics utilised. The use of better materials or a plurality of series inductors would increase the inductance of the inductor up to, for example, approximately 200 µH.

Each end of the main inductor 20 is provided with a connection to the signal input/output line 16. A first connection 22 between the mains electricity input 12 and signal input/output line 16 comprises a first or coupling capacitor 24 having a capacitance of between 0.01 and 0.50 µF preferably 0.1 µF. This coupling capacitor 24 is connected to a first fuse 26 which is arranged to blow in the event of failure or a fault developing in capacitor 24.

A second connection 28 includes a second capacitor 30 having a capacitance of between 0.001 and 0.50 µF, preferably 0.1 µF. This capacitor provides further attenuation of the communication signals by shorting to the earth or ground 18. A second fuse 32 is provided to blow if a fault develops in the second capacitor 30 thereby preventing further unit damage.

The signal input/output line 16 is connected to a second inductor 34 having an inductance of approximately 250 µH minimum. This inductor is provided as a damage limiter in the event of failure of the coupling capacitor 24. In the event of such failure this inductor provides a path to the ground 18 for the 50 Hz mains electricity power frequency thereby blowing fuse 26. The inductor has no effect on the communication frequency signals present on the signal input/output line 16.

Figure 7:
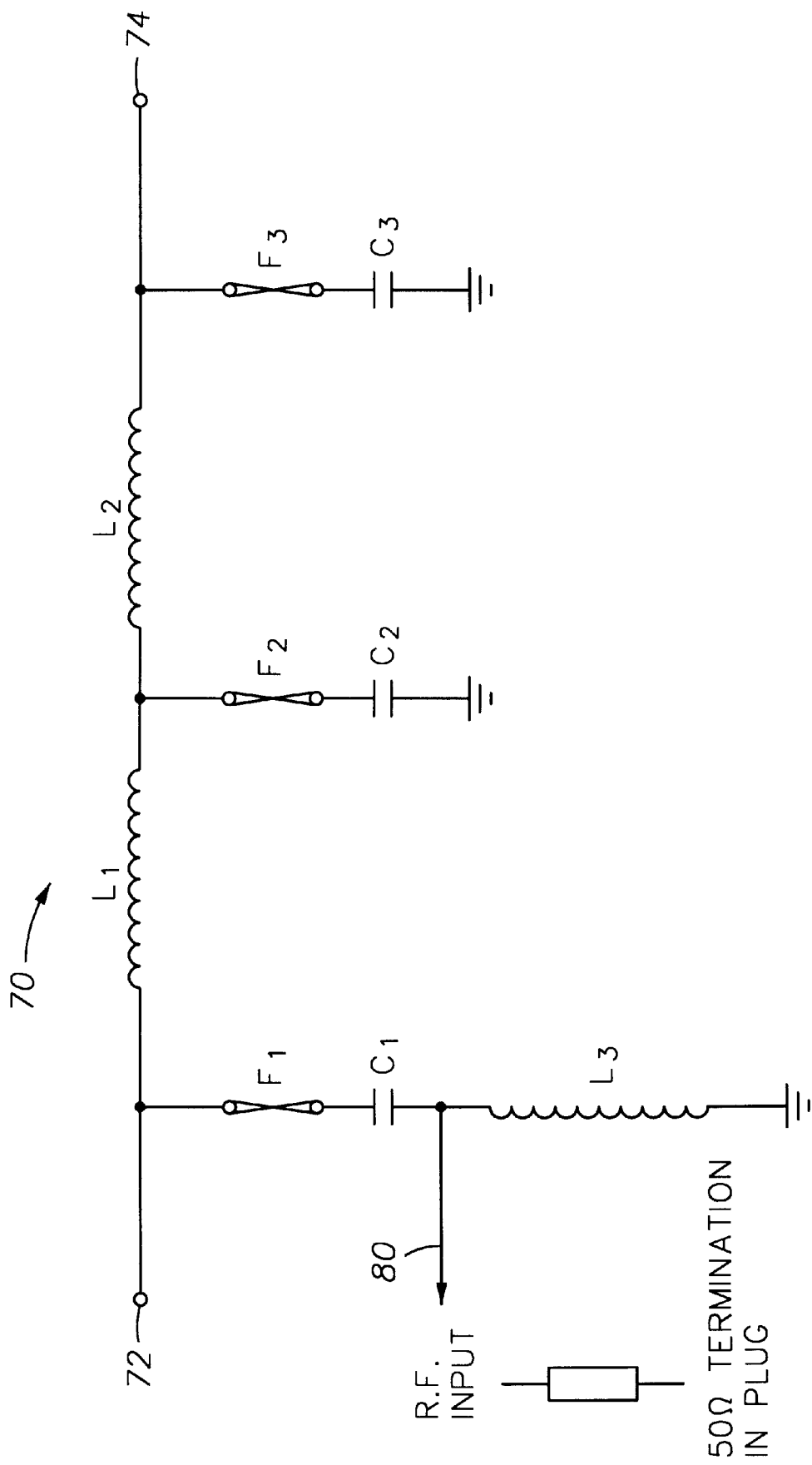
FIG. 7 is a second embodiment of a network conditioning unit according to an aspect of the present invention.

FIG. 7 shows a second embodiment of a filter according to an aspect of the present invention. The filter 70 includes a pair of inductors L1, L2 arranged in series between a mains electricity input 72 and a mains electricity output 74. A preferred value for L1 and L2 is approximately 16 $\mu$H. Connected between the RF input line 80 and the mains input 72 is a first fuse F1 and capacitor C1, and connected between the RF input 80 and ground is a third inductor L3, which acts as an RF choke and has a typical value of 250 $\mu$H.

Connected in a similar fashion between the connection point of L1 and L2 and ground is a second fuse F2 and second capacitor C2. Connected between the mains electricity output 74 and ground is a third fuse F3 and third capacitor C3. Typical value for the capacitors is around 0.1 $\mu$F and for the fuses approximately 5 amps HRC.

Figure 8:
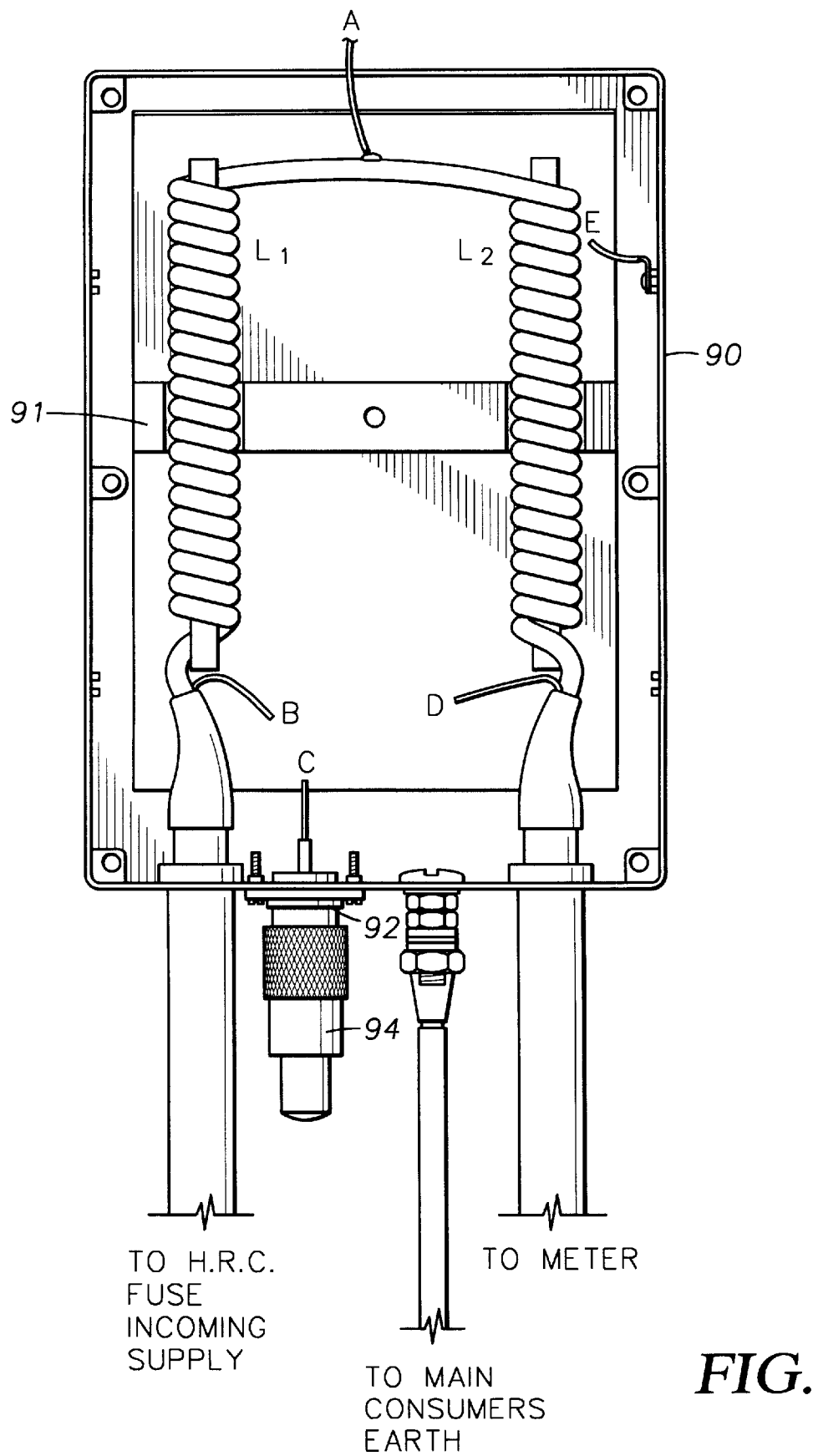
FIG. 8 is a plan view of a network conditioning unit.

Turning to FIG. 8 a typical housing arrangement for a network conditioning unit according to an embodiment of the present invention is shown. The main inductors L1 and L2 are housed within a shielding box 90 and mounted on a conductor clamp 91. Various connections are shown, including a communication interface port 92 to which a user's communication equipment would normally be connected. However, as shown in FIG. 8, this port may be terminated in an impedance matching port terminator 94.

Figure 9:
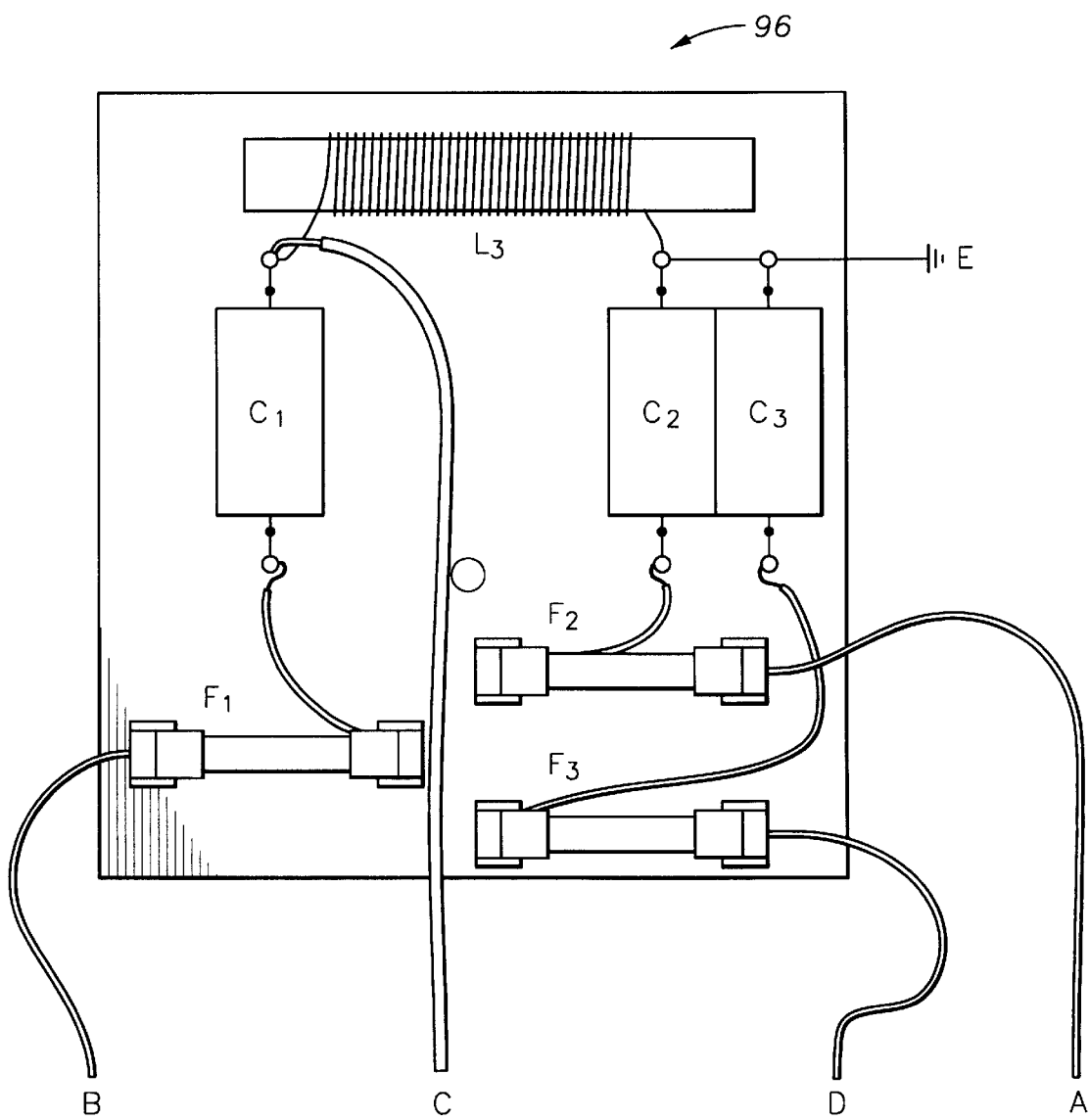
FIG. 9 is a view of a circuit board for the network conditioning unit of FIG. 8.

FIG. 9 shows a circuit board 96 which fits inside the unit 90 of FIG. 8 and houses the rest of the circuitry for the network conditioning unit of FIG. 7. Connections A, B, C, D and E are shown which connect to the appropriate points of the box shown in FIG. 8.

Figure 10:
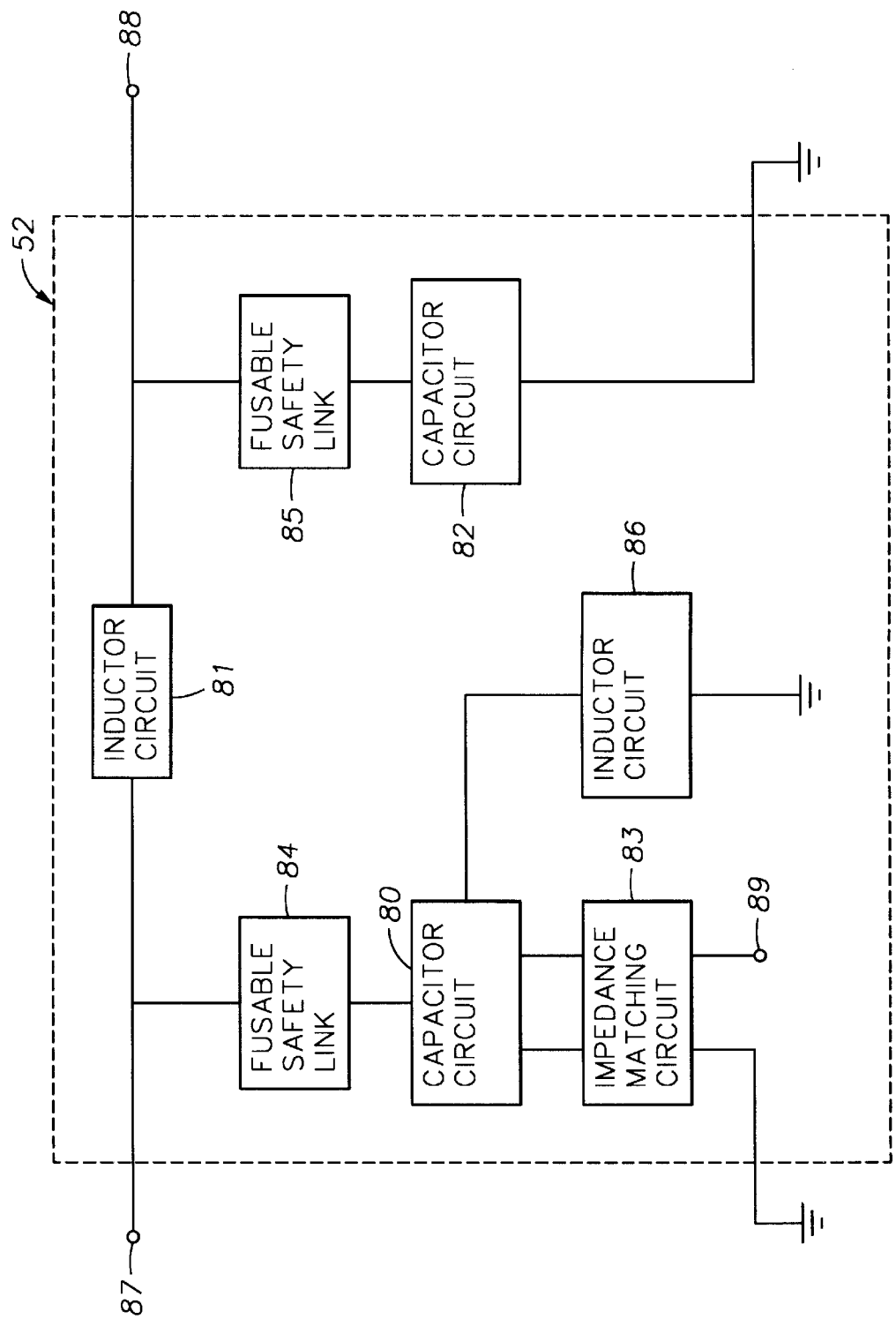
FIG. 10 is a schematic diagram of a network conditioning unit according to the present invention.

FIG. 10 is a schematic representation of a network conditioning unit 52, showing the various building blocks 80–86 of the network conditioning unit. Shown in FIG. 10 is a terminal 87 for connection to an electricity distribution or transmission phase conductor, an output terminal 88 for connection to a single phase feed, and a communication port terminal 89. To design a suitable network conditioning unit, the circuits represented by blocks 81 and 86 should be high-impedance elements over the required communications frequency spectrum (eg. 1 MHz and above) and low impedance elements at frequency of mains electricity supply (ie. 50/60 Hz) ie. these elements are inductors. Similarly blocks 80 and 82 should be low impedance coupling elements over the required communications frequency spectrum and high impedance isolating elements at the frequency of the mains electricity supply ie. they are capacitors.

HRC fault current limiting fusable safety links (84 and 85) are provided in series with elements 80 and 82. An additional impedance matching network 83 may be included for connection to a communications port. This element may be external to the network conditioning unit 52.

The optimum values of items 81, 80, 82 and 86 will be dependent upon factors including:
a) The required frequency range over which the network is to be conditioned.
b) The unit length of the network which is to be conditioned.
c) The number and types of loads which may be encountered on the network.
d) The characteristic impedance of the network phase conductors with respect to earth ie. conductor outer electrical sheath.
e) The impedance of the communications interface devices.

The network conditioning unit may be filled with air, inert gas, resin compound or oil depending upon the location and load and/or fault current ratings of the conditioning unit. Also it may be sited indoors, pole mounted, buried underground or inserted in street lamp columns.

Similarly items 81 and 86 may comprise of a number of individual inductors in series, and if no interconnection is required, for example, on a street light, items 84, 80, 83 and 86 may be omitted.

Items 80 and 82 may comprise a number of capacitors in series and/or parallel configuration depending upon working voltages encountered ie. 240V, 415V, 11 kV, 33 kV etc. Alternatively, or additionally, items 80 and 82 may comprise of two or more capacitors in parallel in order to overcome, for example, deficiencies in capacitor design when conditioning a network over a relatively wide frequency range, for example 50 MHz to 500 MHz.

Furthermore, items 81, 85 and 82 of the network conditioning unit may be cascaded if required. In a typical design, the greater the number of cascaded elements the sharper will be the roll off response of the filter.

It will be seen from the foregoing that the invention provides a simple filter effectively separating signals having a frequency spectrum indicative of radio communication signals from those of standard mains electricity power supply without significant loss of power or quality in either signal. Thus the electricity distribution and/or transmission networks can be used for both the provision of electricity supply and the propagation of telecommunication signals.

The use of a filter according to the invention at each consumer supply point in a low voltage underground electricity distribution network provides a conditioned network suitable for the transmission of high frequency communication signals together with the distribution of 50 Hz, 240V single and 415V, three phase electricity supplies. The provision of such a conditioned network constitutes a further aspect of the invention.

The invention is not confined to the foregoing details and variations may be made thereto within the scope of the invention.

I claim:

1. A method of signal transmission including input of a telecommunication signal having a carrier frequency of greater than approximately 1 MHz onto a trunk and branch multipoint electricity distribution and/or power transmission network, and subsequent reception of the telecommunication signal, wherein the telecommunication signal is input onto and received from the network using communications apparatus, the communications apparatus including a low pass filter portion allowing a low frequency high amplitude mains electricity power signal to pass from the network to a consumer's premises and preventing electrical noise from the premises entering the network, and a coupling element providing input and/or removal of the telecommunication signal from the network.

2. The method as claimed in claim 1, wherein the network is a polyphase network, and the telecommunication signal is injected onto only one phase of the network.

3. The method as claimed in claim 1, wherein telecommunication signals are transmitted over the network in a plurality of directions simultaneously.

4. The method as claimed in claim 1, wherein the telecommunication signal is modulated using a spread spectrum technique.

5. The method as claimed in claim 1, wherein said low pass filter portion isolates variable impedance low frequency loads from the telecommunication signal present on the network.

6. The method as claimed in claim 1, wherein the communications apparatus directs the telecommunication signal into the network away from the consumer's premises.

7. Communications apparatus for use with an electricity distribution and/or power transmission network, including a low pass filter portion for allowing, in use, a low frequency high amplitude mains electricity power signal to pass from the network to a consumer's premises and for preventing electrical noise from the premises entering the network, and a coupling element for input and/or removal of a telecommunication signal from the network.

8. The communications apparatus as claimed in claim 7 wherein the coupling element is suitable for use with the telecommunication signal having a carrier frequency of greater than 1 MHz.

9. The communications apparatus as claimed in claim 7, including a terminating element for terminating the communications apparatus in a similar impedance to a characteristic impedance of the network.

10. The communications apparatus as claimed in claim 7, including impedance matching means for impedance matching between reception/transmission devices and a characteristic impedance of the network.

* * * * *

(12) EX PARTE REEXAMINATION CERTIFICATE (8674th)
United States Patent
Brown

(10) Number: US 5,929,750 C1
(45) Certificate Issued: *Nov. 22, 2011

(54) TRANSMISSION NETWORK AND FILTER THEREFOR

(75) Inventor: Paul Anthony Brown, Kendal (GB)

(73) Assignee: Amperion, Inc., Andover, MA (US)

Reexamination Request:
No. 90/011,139, Aug. 26, 2010

Reexamination Certificate for:
Patent No.: 5,929,750
Issued: Jul. 27, 1999
Appl. No.: 08/826,983
Filed: Apr. 9, 1997

(*) Notice: This patent is subject to a terminal disclaimer.

Related U.S. Application Data

(63) Continuation of application No. 08/347,427, filed on Nov. 29, 1994, now Pat. No. 5,684,450.

(51) Int. Cl.
*H02J 13/00* (2006.01)
*H04B 3/54* (2006.01)
*H04B 3/56* (2006.01)

(52) U.S. Cl. ............... 370/493; 324/548; 340/12.34; 340/12.36; 340/12.38; 340/310.13; 340/310.15; 340/310.17

(58) Field of Classification Search ............ 340/310
See application file for complete search history.

(56) References Cited

To view the complete listing of prior art documents cited during the proceeding for Reexamination Control Number 90/011,139, please refer to the USPTO's public Patent Application Information Retrieval (PAIR) system under the Display References tab.

*Primary Examiner*—Anjan Deb

(57) ABSTRACT

A power transmission network which includes an input of telecommunication signals having carrier frequencies greater than 1 MHz onto the network, and removing similar speech and/or data signals from the network. Preferably a network conditioning element is used which includes a low pass filter portion for filtering out a low frequency high amplitude mains power signal, and a coupling element for input and/or removal of telecommunication signals from the network. In this way both speech and data signals can be transmitted at carrier frequencies of greater than 1 MHz along a standard electricity distribution and/or transmission network which when conditioned provides a larger available spectrum per unit length of network and greater transmsision capacity than previously known. The quiescent noise level of the conditioned network is also much reduced thus permitting lower signal injection levels for a given signal-to-noise ratio and a consequential reduction in spurious radiation from the network.

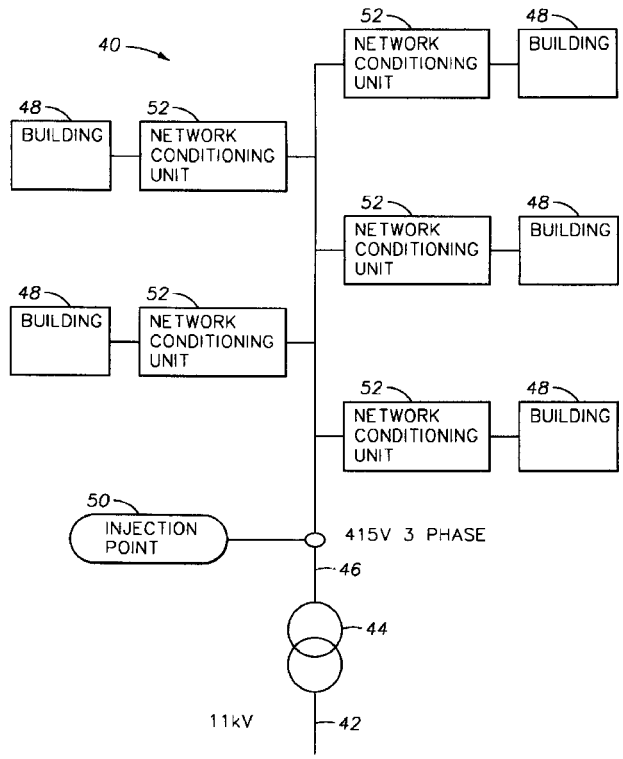

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-3, 5 and 6 is confirmed.

Claim 8 is cancelled.

Claims 7 and 10 are determined to be patentable as amended.

Claims 4 and 9 were not reexamined.

7. Communications apparatus for use with an electricity distribution and/or power transmission network, including a low pass filter portion for allowing, in use, a low frequency high amplitude mains electricity power signal to pass from the network to a consumer's premises and for preventing electrical noise from the premises entering the network, and a coupling element for input and/or removal of a telecommunication signal ffrom the network, *wherein the coupling element is suitable for use with the telecommunication signal having a carrier frequency of greater than 1 MHz.*

10. [The communications apparatus as claimed in claim 7, including] *Communications apparatus for use with an electricity distribution and/or power transmission network, including a low pass filter portion for allowing, in use, a low frequency high amplitude mains electricity power signal to pass from the network to a consumer's premises and for preventing electrical noise from the premises entering the network, a coupling element for input and/or removal of a telecommunication signal from the network, and* impedance matching means for impedance matching between reception/transmission devices and a characteristic impedance of the network.

* * * * *